US005756140A

United States Patent [19]
Shoop et al.

[11] Patent Number: 5,756,140
[45] Date of Patent: May 26, 1998

[54] BROWNING COMPOSITION AND METHOD OF BROWNING DOUGH-BASED FOODSTUFFS

[75] Inventors: John Shoop; Gary L. Underwood, both of Manitowoc, Wis.

[73] Assignee: Red Arrow Products Company Inc., Manitowoc, Wis.

[21] Appl. No.: 840,943

[22] Filed: Apr. 21, 1997

[51] Int. Cl.$^6$ ........................................ A21D 8/00
[52] U.S. Cl. ........................ 426/302; 426/305; 426/653; 426/496
[58] Field of Search ........................ 426/268, 270, 426/302, 305, 653, 443, 446, 496, 520

[56] References Cited

U.S. PATENT DOCUMENTS

| | | | |
|---|---|---|---|
| 4,250,199 | 2/1981 | Underwood et al. | 426/533 |
| 4,657,769 | 4/1987 | Petrofsky et al. | 426/549 |
| 4,876,108 | 10/1989 | Underwood et al. | 426/650 |
| 4,959,323 | 9/1990 | Underwood | 426/271 |
| 4,994,297 | 2/1991 | Underwood et al. | 426/650 |
| 5,039,537 | 8/1991 | Underwood | 426/271 |
| 5,135,770 | 8/1992 | Underwood | 426/650 |
| 5,252,188 | 10/1993 | Stradal et al. | 203/43 |
| 5,270,067 | 12/1993 | Underwood et al. | 426/138 |
| 5,292,541 | 3/1994 | Underwood et al. | 426/250 |
| 5,393,542 | 2/1995 | Stradal et al. | 426/241 |
| 5,397,582 | 3/1995 | Underwood et al. | 426/250 |
| 5,520,937 | 5/1996 | Yasosky et al. | 426/94 |
| 5,681,603 | 10/1997 | Underwood | 426/271 |

OTHER PUBLICATIONS

"Dairy ingredient replaces egg wash on bakery products," *Food Processing,* 1985, p. 60.

"Starch-based glazes for bakery industry," *Food Engineering Int'l,* 1991, p. 24.

MAILLOSE Product Specifications Red Arrow Products.

*Primary Examiner*—Milton Cano
*Attorney, Agent, or Firm*—Marshall, O'Toole, Gerstein, Murray & Borun

[57] ABSTRACT

A browning composition for the exterior of dough-based foodstuffs is disclosed. After heating a foodstuff coated with the browning composition, the foodstuff has a golden brown and shiny exterior.

30 Claims, No Drawings

BROWNING COMPOSITION AND METHOD OF BROWNING DOUGH-BASED FOODSTUFFS

FIELD OF THE INVENTION

The present invention relates to compositions and methods of achieving a glossy, golden brown appearance on the exterior of dough-based foodstuffs. In particular, the present invention relates to compositions that can be substituted for traditional egg washes for coating the exterior of dough-based foodstuffs to brown the foodstuff and to impart gloss.

BACKGROUND OF THE INVENTION

Consumers desire a dough-based foodstuff having a golden brown and shiny exterior. One traditional method of achieving an exterior sheen and brown color on a dough-based foodstuff is to apply a coating of an aqueous solution of whole eggs or egg yolks, i.e., an egg wash, on the surface of the foodstuff. When the foodstuff, like a bakery good, is baked, or when a frozen bakery good is reheated, the egg wash gives the heated bakery good the esthetic gloss and brown color that consumers equate to palatability.

However, traditional egg washes have disadvantages. One disadvantage is the cost a traditional egg wash adds to a dough-based foodstuff. A traditional egg wash has a relatively high raw material cost, plus a relatively large portion of a traditional egg wash is wasted because the egg wash is prepared very shortly before use, and unused egg wash is discarded.

In particular, traditional egg washes provide an excellent medium for bacterial proliferation, and are very susceptible to bacterial contamination. A traditional egg wash must be used relatively quickly because of the risk of coating the dough-based foodstuff with a contaminated egg wash, which is the greatest disadvantage of traditional egg washes. Food processors and bakeries, therefore, are continually on guard against coating bakery goods with a tainted egg wash. Accordingly, an egg wash that is not used relatively quickly is discarded, which further increases the already high cost of the egg wash process step.

In addition, egg wash application equipment, like lines and pumps, must be cleaned at regular intervals to avoid bacterial growth in the equipment caused by contaminated egg wash. Obviously, bakeries would prefer to use an egg wash over an extended time in order to avoid discarding unused egg wash, and to avoid repeated cleaning of application equipment. Bakeries also would like to overcome the possibility of bacterial contamination of the egg wash.

Investigators have sought substitutes for traditional egg washes that duplicate the brown color and gloss a traditional egg wash imparts to dough-based foodstuffs, while reducing the cost of the process step and reducing, or eliminating, the possibility of applying a contaminated egg wash to the foodstuffs. For example, C. Andres, *Food Processing*, November, 1985, discloses an egg wash substitute. The substitute is a powdered modified milk protein that is dissolved in water before use. *Food Engineering Int'L*, October, 1991, discloses a starch-based bakery glaze as a substitute for an egg wash. The starch-based bakery glaze also is a powdered product that is dispersed in water before use. These substitutes partially overcome the problem of contamination because they are stored as solids until use. However, bacterial growth and contamination remain a concern after the egg wash substitute is dissolved in water. Therefore, the problems of discarding unused egg wash substitute and repeated cleaning of application equipment remain.

To date, egg wash substitutes also have suffered from one or more other deficiencies, such as insufficient browning and/or inferior gloss imparted onto the exterior of a dough-based foodstuff. Because of these deficiencies, traditional egg washes are still used to coat the exterior of the majority of dough-based foodstuffs.

As stated above, an egg wash imparts esthetic properties to dough-based foodstuffs, like biscuits, dinner rolls, and bagels, that consumers equate to palatability. However, food processors and bakeries still are seeking a substitute for the traditional egg wash. Ideally, the egg wash substitute can be used both on bakery goods that are prepared, baked, and sold fresh, like in bakeries, and on pre-prepared bakery goods that are refrigerated or frozen, and later heated, such as pies and dinner rolls. Additionally, it would be advantageous if the egg wash substitute imparted the desired esthetic effects of gloss and browning without regard to the method of baking or heating the dough-based foodstuff, e.g., in a regular, convection, or microwave oven. Finally, the egg wash substitute should not adversely affect the taste or odor of the dough-based foodstuff.

A need exists, therefore, for an egg wash substitute that overcomes the problems and disadvantages associated with traditional egg washes, especially with respect to bacterial contamination, wasted egg wash, and cost. The present egg wash substitutes overcome these disadvantages, while providing dough-based foodstuffs having the esthetic properties required by consumers. In addition, the present egg wash substitutes can be applied to all types of dough-based foodstuffs, e.g., fresh, refrigerated, or frozen goods. With respect to refrigerated and frozen dough-based foodstuffs, the egg wash substitute provides an exterior sheen and golden brown color regardless of the method of heating the foodstuff. The present egg wash substitutes provide a heated foodstuff with the palatability and esthetic properties equivalent to a dough-based foodstuff coated with a traditional egg wash, while reducing cost and waste, and avoiding bacterial contamination, without adversely affecting the taste or odor of the foodstuff.

SUMMARY OF THE INVENTION

The present invention relates to compositions that are applied as a coating to the exterior surface of dough-based foodstuffs, such that when the foodstuff is baked, or otherwise heated, the exterior surface exhibits a palatable gloss and golden brown color. Therefore, one aspect of the present invention is to provide dough-based foodstuffs, such as biscuits, dinner rolls, pies, bagels, and puff pastries, having a thin coating of a substitute egg wash composition that imparts a golden brown color and a gloss to the dough-based foodstuffs during a heating step.

In particular, the present invention relates to a substitute egg wash composition for application to the exterior surface of dough-based foodstuffs, wherein heating the dough-based foodstuffs in a regular oven, convection oven, or microwave oven, or a toaster or other heating device, provides a heated foodstuff having a golden brown, shiny exterior. More particularly, the present invention relates to substitute egg wash compositions comprising:

(a) hydroxyacetaldehyde;

(b) a food starch, a maltodextrin, a hydrolyzed collagen, a food gum, or a mixture thereof;

(c) optionally, a nitrogen-containing compound; and (d) water.

The substitute egg wash composition is a liquid composition and does not support bacterial growth. Accordingly, the substitute egg wash composition is free of preservatives and does not require refrigeration.

Preferably, the source of hydroxyacetaldehyde is an aqueous solution derived from vapor of a pyrolyzed sugar, starch, or mixture thereof. Such solutions typically contain about 3% to about 6%, by weight, hydroxyacetaldehyde, and preferably have a low °Brix to hydroxyacetaldehyde ratio, i.e., a ratio of about 5 or less, to ensure that no adverse flavor is imparted to the dough-based foodstuffs.

A substitute egg wash composition of the present invention is applied as a relatively thin coating that adheres to the exterior surface of a dough-based foodstuff. The foodstuff is a dough product, or has a filling covered or surrounded by a dough, for example, a biscuit, a dinner roll, a pie, a sweet roll, a bagel, baked pates having a crust overwrap, a croissant, bread, or a filled pastry. During heating or baking of the coated foodstuff in a regular, convection, or microwave oven, the substitute egg wash composition provides a golden brown color and a gloss on the exterior surface of the dough of the foodstuff. The substitute egg wash composition does not impart a detectable taste or odor to the dough-based foodstuff.

In accordance with one important aspect of the present invention, a present substitute egg wash composition comprises:

(a) about 0.1% to about 5% by weight of hydroxyacetaldehyde;

(b) about 1% to about 25% by weight of a food starch, a maltodextrin, a hydrolyzed collagen, a food gum, or a mixture thereof;

(c) 0% to about 20% by weight of a nitrogen-containing compound; and (d) water.

The substitute egg wash composition also can contain other optional ingredients, such as surfactants, flavoring agents, plasticizers, and/or detackifiers, for example.

In a preferred embodiment, the hydroxyacetaldehyde source is an aqueous solution derived from vapor of a pyrolyzed sugar, starch, or mixture thereof.

In accordance with another important aspect of the present invention, a substitute egg wash composition is applied to the exterior of a dough-based foodstuff as a relatively thin coating. The coated foodstuff, such as a pie, then can be baked to provide a baked pie having a golden brown and shiny crust. Alternatively, the coated foodstuff, such as dinner rolls or a fruit-filled pastry, can be refrigerated or frozen for eventual distribution to consumers.

The refrigerated or frozen coated foodstuff then can be heated by the consumer in a regular, microwave, or convection oven, or a toaster, to provide a heated foodstuff having the golden brown color and gloss that consumers equate to palatability.

It is, therefore, an aspect of the present invention to provide a dough-based foodstuff coated with a substitute egg wash composition which, after baking or heating, has the esthetic properties of a foodstuff coated with a traditional egg wash. Another aspect of the present invention is to overcome the disadvantages associated with a traditional egg wash, such as waste, high cost, and bacterial contamination.

These and other aspects and novel features of the present invention will become apparent from the following detailed description of the preferred embodiments.

DETAILED DESCRIPTION OF THE PREFERRED EMBODIMENTS

A substitute egg wash composition of the present invention is a liquid composition having a viscosity of up to about 1,500 centipoises (cps), and preferably up to about 1,000 cps, as measured using a Rheology International Viscometer Model RI:1:L. Typically, the composition has a viscosity of about 10 to about 1,000 cps, and preferably about 15 to about 500 cps. The composition, therefore, is easy to apply as a spray, for example, on the exterior surface of a dough-based foodstuff. A viscosity in this range provides a composition that does not run off the dough-based foodstuff after application and prior to heating.

As discussed hereafter, a powdered concentrate of a substitute egg wash composition also can be prepared. However, the powdered concentrate is dissolved or dispersed in water to provide an aqueous substitute egg wash composition having a viscosity of about 10 to about 1,500 cps prior to applying the composition to the exterior surface of a dough-based foodstuff.

The substitute egg wash compositions resist bacterial contamination. Therefore, the compositions can be stored as unrefrigerated liquids for extended periods, i.e., for at least 6 months. Traditional egg washes require refrigeration, and are prepared very shortly before use to avoid bacterial contamination. Any unused traditional egg wash cannot be stored because of the possibility of bacterial contamination, and, therefore, is discarded. The substitute egg wash compositions overcome the bacterial contamination problem associated with traditional egg washes, and reduce the cost of the egg wash step by eliminating waste attributed to disposal of unused traditional egg wash.

The present substitute egg wash compositions provide further cost savings because, at application levels, a substitute egg wash composition is less expensive than a traditional egg wash. In addition, the application equipment can be cleaned less frequently, thereby substantially reducing the expense of cleaning the equipment and the production losses associated with interrupting the production line to conduct the cleaning operation.

The substitute egg wash compositions of the present invention comprise:

(a) hydroxyacetaldehyde;

(b) a food starch, a maltodextrin, a food gum, or a mixture thereof;

(c) optionally, a nitrogen-containing compound; and (d) water.

The composition is a liquid composition that does not support bacterial growth and, therefore, is free of preservatives. The composition also can contain other optional ingredients known to persons skilled in the art.

In a preferred embodiment, the source of hydroxyacetaldehyde is an aqueous solution derived from vapor of a pyrolyzed sugar, starch, or mixture thereof.

In particular, a substitute egg wash composition of the present invention contains about 0.1% to about 5%, by weight, hydroxyacetaldehyde. Hydroxyacetaldehyde is the simplest sugar and can be prepared by pyrolyzing a carbohydrate-containing feedstock, like wood, as disclosed in Underwood et al. U.S. Pat. No. 4,876,108, incorporated herein by reference. However, pyrolysis products contain numerous other chemical components, many of which impart flavor to a foodstuff. Accordingly, a majority of pyrolysis products containing hydroxyacetaldehyde are not useful on a dough-based foodstuff because the taste would be unappealing.

However, hydroxyacetaldehyde can be isolated from pyrolysis products, as set forth in Stradal et al. U.S. Pat. No. 5,252,188, incorporated herein by reference. Aqueous solutions of such isolated hydroxyacetaldehyde can be used in the present substitute egg wash compositions. Similarly, precipitated hydroxyacetaldehyde can be used in the present composition.

It would be advantageous to use a pyrolysis product as the source of hydroxyacetaldehyde such that the time and expense of isolating the hydroxyacetaldehyde can be saved. This is accomplished by using a pyrolysis product of a sugar and/or starch. Such pyrolysis products contain hydroxyacetaldehyde, and have a low to negligible taste, thereby making use on a dough-based foodstuff acceptable.

In particular, a substitute egg wash composition contains about 2 to about 60%, and preferably about 5 to about 40%, by weight of the composition, an aqueous solution derived from vapor of a pyrolyzed sugar and/or starch. To achieve the full advantage of the present invention, the composition contains about 5% to about 30% by weight of an aqueous solution derived from vapor of a pyrolyzed sugar and/or starch.

An aqueous solution derived from vapor of a pyrolyzed sugar and/or starch is described and prepared as set forth in U.S. Pat. No. 5,292,541, incorporated herein by reference.

A preferred aqueous solution derived from vapor of a pyrolyzed sugar and/or starch is a liquid product derived from pyrolyzed dextrose. These aqueous solutions contain about 3% to about 6% by weight hydroxyacetaldehyde, and preferably having a °Brix to hydroxyacetaldehyde ratio of about 5 or less, i.e., about 5 to about 1. Furthermore, the aqueous solution has a low pH of about 2.5 to about 3.5, and about 9.5 to about 13.5% wt/vol of carbonyls.

The hydroxyacetaldehyde content of the aqueous solution derived from vapor of a pyrolyzed sugar and/or starch, i.e., the aqueous pyrolysis solution, provides a substitute egg wash composition that can impart a golden brown color to dough. In addition, the amount of total aldehydes is sufficiently high, such that the aldehydes act as a preservative to retard or eliminate bacterial growth in the substitute egg wash composition. The low ratio of °Brix to hydroxyacetaldehyde provides a substitute egg wash composition that can brown a dough-based foodstuff, but does not adversely affect the taste of the foodstuff. Therefore, the aqueous solution helps provide a golden brown color without imparting a flavor that is detectable by taste or aroma, and overcomes the problem of bacterial proliferation and contamination.

The aqueous pyrolysis solution is derived from vapor of a pyrolyzed sugar and/or starch. The sugar can be, for example, a mono-, di-, and/or trisaccharide. Specific, nonlimiting, sugars that can be pyrolyzed are glucose, sucrose, dextrose, invert sugar, galactose, fructose, mannose, ribose, erthyrose, sorbose, lactose, a corn syrup, a malt syrup, and molasses. Milk is a well-known source of lactose, and lactose found in whey is a relatively abundant by-product of the cheese-making process. Thus, lactose is a readily available sugar. In particular, dextrose, lactose, and a corn syrup are the preferred sugars that are pyrolyzed. Nonlimiting examples of starches that can be pyrolyzed are corn starch, potato starch, wheat starch, oat starch, tapioca starch, and rice starch.

The pyrolysis of a sugar or starch provides an aqueous pyrolysis solution containing hydroxyacetaldehyde. The concentration of hydroxyacetaldehyde in the aqueous pyrolysis solution is about 0.5% to about 30% by weight of the aqueous pyrolysis solution, or, alternatively, about 0.1% to about 5% by weight of the substitute egg wash composition. Preferred substitute egg wash compositions contain about 0.2% to about 4%, and to achieve the full advantage of the present invention about 0.25% to about 3%, by weight of hydroxyacetaldehyde. The substitute egg wash composition, therefore, has the ability to brown a dough-based foodstuff using a low concentration of hydroxyacetaldehyde.

The following examples illustrate aqueous solutions derived from vapor of a pyrolyzed sugar, starch, or mixture thereof, and made in accordance with U.S. Pat. Nos. 5,292,541 and 5,397,582, both incorporated herein by reference. In the examples, the concentration values for the organic components are given as °Brix values. The °Brix values were obtained using standard techniques that are well known in the sugar industry. The percent weight (% wt) values for hydroxyacetaldehyde were obtained using gas chromatography and comparing the peak integrations of a sample of a liquid (diluted if necessary) with peak integrations of a standard curve generated from a 1–5% serial dilution of hydroxyacetaldehyde in water. Gas chromatograms were run on a Varian Gas Chromatograph (Model 3300 equipped with a Varian Integrater Model 4290) fitted with a fused-silica capillary column (either a 0.25 mm×60 m J&W DB1701 column or a 0.25 mm×0.30 m J&W DB-Wax column) using hydrogen carrier gas at a flow rate of 2.0 ml/mm and a temperature program of 40° C. initial temperature, zero minute hold followed by increasing the temperature 8.0° C./minute to 255° C. The injector temperature was 200° C., the detector temperature was 300° C.

Under these conditions, the retention time of hydroxyacetaldehyde in the J&W DB-1701 column was 2.85 minutes, and on the J&W DB-Wax column was 4.70 minutes.

EXAMPLE A

Dextrose (CERELOSE® dextrose 2001, dextrose equivalent (DE) 95, available from Corn Products, Inglewood Cliffs, N.J.) was fast pyrolyzed at about 550° C. in an upflow circulating fluidized bed reactor with a vapor residence time of 0.7 seconds at a pressure of 1 to 1.5 pounds per square inch (psi). The vapors were condensed by direct contact with 20° C. recirculating water. About five pounds of dextrose were fed to the apparatus over a twenty-minute period.

The resulting raw pyrolysis liquid had a Brix value of about 40°, and contained about 0.5% wt hydroxyacetaldehyde. The solution was then concentrated at 50° C. under a water aspirator vacuum of about −28.5 inches of mercury to remove excess water to give a concentrated solution of about 63° Brix and a hydroxyacetaldehyde concentration of about 29% wt.

This concentrated solution is diluted with sufficient water to provide an aqueous solution derived from vapor of a pyrolyzed sugar, starch, or mixture thereof having a soluble organic content of less than about 50° Brix, which is useful in a substitute egg wash composition of the present invention.

EXAMPLE B

Powdered dextrose was pyrolyzed in a downflow flow transport reactor using sand as the heat transfer media. The reactor temperature was 600° C. and the vapor residence time in the reactor was 75 msec. The pyrolysis liquid yield was 83.5%, noncondensable gases yield was 14% and char yield was 2.5%. The composition of the condensed raw pyrolysis liquid was as follows:

| Brix | 64.7° |
|---|---|
| Water | 34.3% |
| Hydroxyacetaldehyde (wt) | 25.5% |

-continued

| | |
|---|---|
| Acetol | 2.6% |
| Acetic acid (wt/vol) | 1.6% |
| Other organics (including hydroxymethyl furfural) | 36.0% |

This concentrated solution is diluted with sufficient water to provide an aqueous solution derived from vapor of a pyrolyzed sugar, starch, or mixture thereof having a soluble organic content of less than about 50° Brix, which is useful in a substitute egg wash composition of the present invention.

EXAMPLE C

The initial 4° Brix pyrolysis liquid obtained in Example A was concentrated by evaporation under reduced pressure to give an 18° Brix solution containing about 5% wt/vol hydroxyacetaldehyde. A portion of this solution (60 milliliters (ml)) was extracted with three portions of food-grade methylene chloride (20 ml) to remove flavor components. The extracted solution then was treated batchwise with two types of food-grade resins, first with the Rohm & Haas cationic resin IR-120 (3 grams (g)) to remove additional flavor constituents. The resulting solution (about 12.90° Brix) was evaporated to about 50° Brix to remove low molecular weight volatile components and residual methylene chloride. The concentrated solution contained about 32% wt hydroxyacetaldehyde. Subsequently, the concentrate was diluted with water to 13° Brix, which is a suitable concentration for use in a substitute egg wash composition of the present invention.

EXAMPLE D

Dextrose was fast pyrolyzed at about 500° C. in an upflow circulating fluidized bed reactor. The vapor residence time was about 0.7 seconds, the pressure was about 1 to 1.5 psi, and the pyrolysis vapors were condensed and solubilized by direct contact with circulating 20° C. water. The resulting aqueous condensate solution contained about 4° Brix total organic solids as determined by refractive index, and about 0.5% wt hydroxyacetaldehyde as determined by gas chromatography. This solution then was concentrated to 18° Brix organic solids by rotary evaporation and was found to contain about 6% wt hyroxyacetaldehyde. A portion of this solution (60 ml) was then extracted with three portions of food-grade methylene chloride (20 ml) to remove flavor components. The solution then was concentrated to 50° Brix organic solids to remove low molecular weight flavor components. This solution was found to contain 23% wt hydroxyacetaldehyde by gas chromatography. Water then was added to dilute the solution back to 5% wt hydroxyacetaldehyde and 12° Brix, which is a suitable concentration for use in a substitute egg wash composition of the present invention.

EXAMPLE E

Lactose was pyrolyzed in a circulating fluidized bed reactor, capable of processing about 100 lbs/hr of solid feedstock, at 500° C. in an upflow circulating fluidized bed reactor. The vapor residence time in the reactor was about 0.7 seconds, the pressure was about 1 to 1.5 psi, and the pyrolysis vapors were condensed by direct contact with circulating 20° C. water as described in Example 1. The resulting condensate solution, or raw pyrolysis liquid, contained about 2° Brix total organic solids as determined by refractive index. The hydroxyacetaldehyde concentration was 0.11% wt, the acetic acid content was less than about 0.01%, and the acetol content was about 0.06% as determined by analytical gas chromatography. The solution was then concentrated by evaporation at 50° C. under a vacuum of −29 inches mercury to 26° Brix organic solids including 4% wt hydroxyacetaldehyde. The concentrated solution (60 ml) was extracted with three portions of food-grade methylene chloride (20 ml) to remove flavor components such as furfural, phenolics, and pyrazines. The extracted solution was then concentrated to 50° Brix organic solids to remove low molecular weight flavor components. This solution was found to be 11% wt hydroxyacetaldehyde. The solution then was diluted with water to 5% wt hydroxyacetaldehyde, and 19° Brix organic solids.

EXAMPLE F

Dextrose was pyrolyzed according to the method of Example 4, and the resulting aqueous solution was concentrated to 18° Brix organic solids and 6% wt hydroxyacetaldehyde. A portion of this solution (60 ml) then was treated batchwise with two types of food-grade resins, first with the Rohm and Haas nonionic XAD-4 resin (6 grams), and then with the Rohm and Haas cationic IR-120 resin (3 grams) to remove flavor components. The solution after resin treatment was found to contain about 13° Brix organic solids by refractive index. It then was concentrated to about 50° Brix organic solids by evaporation to remove low molecular weight flavor components. Gas chromatography analysis showed that this solution contained 23% wt hydroxyacetaldehyde, and that furfural, phenolics, and pyrazines were the major flavor constituents removed by the resin treatment and evaporation. The solution then was diluted with water to 5% wt hydroxyacetaldehyde and about 12° Brix organic solids.

EXAMPLE G

Lactose was fast pyrolyzed according to the method of Example 5. The resulting aqueous liquid product was found to contain about 2° Brix total organic solids by refractive index. This solution then was concentrated by evaporation at 50° C. and −29 inches mercury to about 26° Brix organic solids and then divided into two portions. One portion (100 ml) was extracted with food-grade methylene chloride (3×30 ml) and a second portion was not extracted so as to serve as a control. The organic solids in the extracted portion was reduced from 26° Brix to 22° Brix.

EXAMPLE H

A sample of FRO-DEX-24-D (Amaizo Co., Hammond, Ind.), a powdered starch containing 6% moisture and having a 26% dextrose equivalent content, was fast pyrolyzed at about 500° C. in an upflow circulating fluidized bed reactor. The vapor residence time was about 200 msec and the pyrolysis vapors were condensed and solubilized using a cold water condenser. The resulting condensate solution was found to contain 51° Brix organic solids by refractive index and 24% wt hydroxyacetaldehyde by gas chromatography.

EXAMPLE I

A sample of PF powdered starch (Amaizo Co., Hammond, Ind.) containing about 126 moisture was fast pyrolyzed at about 550° C. in an upflow circulating fluidized bed reactor. The vapor residence time was about 200 msec and the pyrolysis vapors were condensed and solubilized using a cold water condenser. The resulting condensate solution was found to contain 56° Brix organic solids by refractive index and 29% wt hydroxyacetaldehyde by gas chromatography.

EXAMPLE J

High dextrose corn syrup having 83.7% total solids and 16.3% moisture (62 DE/44 Baume' corn syrup, ADM Corn Sweeteners, Cedar Rapids, Iowa) was heated to about 150° F. and then pumped through steam heated conduits into an upflow circulating fluidized bed reactor. The heated corn syrup entered the reactor through a nozzle having a 3/32 inch aperture. The reactor temperature was about 550° C., the vapor resident time was about 700 m sec, and the pressure was about 1.5 psi. The pyrolysis vapors were condensed and solubilized by direct contact with 20° C. recirculating water to give a liquid product having about 30° Brix. The composition of the liquid product was as follows:

| | |
|---|---|
| Hydroxyacetaldehyde (wt) | 16.1% |
| Acetol | 0.81% |
| Acetic Acid (wt/vol) | 1.6% |
| Cyclotene | 0.06% |
| Furfural | 0.41% |
| Methanol/Methyl Acetate | 0.83% |
| Maltol | 0.10% |
| Formic Acid | <0.1% |

The 30° Brix solution was extracted with methylene chloride (one volume methylene chloride to ten volumes solution), and then concentrated by evaporation under reduced pressure (−28.5 inches of mercury) at about 50° C. to give a liquid product of about 45° Brix.

The corn syrup-derived liquid pyrolysis product of Example 10 was diluted with water to about 23° Brix, and had a titratable acidity of 1.6% wt/vol, a browning index of 53.0, and a ratio of titratable acidity to browning index of about 0.03.

An aqueous solution derived from vapor of a pyrolyzed sugar and/or starch is available commercially, as MAILLOSE®, from Red Arrow Products, Co., Inc., Manitowoc, Wis. MAILLOSE® is an aqueous solution of about 8°–10° Brix, having a pH of about 2.5 to about 3.5, and containing about 9% to about 14% wt/vol carbonyls, and about 3.5% to about 6% hydroxyacetaldehyde.

In the above examples, the acids in the aqueous solution are measured as titratable acetic acid (% wt/vol). The browning index is used in the smoke flavoring industry to measure the browning performance of a liquid. The procedures used to determine browning index are described in U.S. Pat. No. 4,876,108, incorporated herein by reference. Briefly, the browning index is a relative measure of the ability of carbonyls to react with the amino acid, glycine. Brix is an indication of the percentage of soluble organic compounds in solution.

In addition to the hydroxyacetaldehyde, the substitute egg wash composition contains about 1% to about 25%, and preferably about 5% to about 25%, by weight of the composition, of a food starch, a maltodextrin, a hydrolyzed collagen, a food gum, or a mixture thereof. To achieve the full advantage of the present invention, the substitute egg wash composition contains about 8% to about 20%, by weight, of a food starch, a maltodextrin, a food gum, or a mixture thereof.

The food starch, maltodextrin, and/or food gum impart gloss to the exterior surface of dough-based foodstuffs by forming a reflecting film on the surface. The food starch, maltodextrin, hydrolyzed collagen, and/or food gum also provides the substitute egg wash composition with a viscosity that facilitates application of the composition onto the dough-based foodstuff. Hydrolyzed collagens contain nitrogen atoms, and, therefore, provide an additional advantage of enhancing the browning ability of the substitute egg wash composition, in addition to imparting gloss.

It was found that sufficient gloss is imparted to the foodstuff when the substitute egg wash composition contains at least about 5% by weight of a food starch, maltodextrin, food gum, hydrolyzed collagen, or mixture thereof. When the amount of maltodextrin, food starch, hydrolyzed gelatin, and/or food gum exceeds about 25% by weight, composition viscosity is too great for easy application of the substitute egg wash composition onto the foodstuff. In addition, if the amount of food starch, maltodextrin, hydrolyzed gelatin, or food gum is too high, the substitute egg wash composition has a tendency to form blisters when the dough-based foodstuff is heated.

The identity of the food starch, maltodextrin, hydrolyzed collagen, or food gum is not particularly limited, and can be any food starch, maltodextrin, hydrolyzed collagen, or food gum useful in foodstuffs. Examples of food starches include, but are not limited to, a modified or unmodified starch derived from any conventional starch source, such as corn, potato, wheat, oat, rice, or tapioca. Particular nonlimiting examples of modified starches are starch hydrolyzates, dextrin, microcrystalline cellulose, and maltodextrin. Examples of food gums include, but are not limited to, locust bean gum, quince gum, guar gum, gum tragacanth, gum arabic, algins, gellan gum, pectin, ghatti, gum karaya, agar, xanthan gums, carrageenan, alginates, and similar food gums, and mixtures thereof. Guar gum, gum arabic, and xanthan gum are preferred food gums. An example of a hydrolyzed collagen is gelatin.

Preferably, a substitute egg wash composition of the present invention contains a food starch, a maltodextrin, a hydrolyzed collagen, or a combination thereof because food gums have a tendency to provide a foodstuff treated with a substitute egg wash composition having a starchy or tacky surface after heating. However, for dough-based foodstuffs wherein a sticky or tacky surface is not a disadvantage, i.e., a cinnamon roll or a danish roll, a food gum can be used in a present egg wash substitute composition to impart a glossy, golden brown appearance to a heated dough-based foodstuff.

The maltodextrins used in the present invention, therefore, have a DE of about 4 to about 19, and preferably about 7 to about 17. To achieve the full advantage of the present invention, the maltodextrin has a DE of about 8 to about 15. The maltodextrins are commercially available from a variety of sources, for example, as the MALTRIN® maltodextrins available from Grain Processing Corporation, Muscatine, Iowa. Modified starches also are available from a variety of commercial sources, for example, the PURE-COTE™ modified corn starches available able from Grain Processing Corporation. Hydrolyzed starches having a DE of about 5 to about 25, also are useful as a component in a present egg wash substitute composition. In especially preferred embodiments, the substitute egg wash composition contains a food starch and a maltodextrin, in a weight ratio of food starch to maltodextrin of about 20:1 to about 1:1.

In other preferred embodiments, the substitute egg wash contains a hydrolyzed collagen, like gelatin. The hydrolyzed collagens both improved the gloss of the dough-based foodstuff and contributes to browning the foodstuff because the hydrolyzed collagen contains nitrogen atoms. A nonlimiting example of a hydrolyzed collagen is a gelatin, either Type A or Type B, or a fish gelatin which are available commercially from a variety of sources, like DynaGel, Inc., Calumet City, Ill. or Food Industry Technology, Miami Beach, Fla. A preferred gelatin is a Type A gelatin.

A substitute egg wash composition of the present invention also can contain a nitrogen-containing compound. The nitrogen-containing compound is an optional ingredient, and is present in an amount of 0% to about 20%, and preferably about 1% to about 15%, by weight of the composition. To achieve the full advantage of the present invention, the nitrogen-containing compound is present in an amount of about 2% to about 12%, by weight of the composition.

The nitrogen-containing compound can be an inorganic compound, an organic compound, or a mixture thereof. The presence of a nitrogen-containing compound increases the browning capability of the substitute egg wash composition. Accordingly, the amount of hydroxyacetaldehyde present in a substitute egg wash composition containing a nitrogen-containing compound can be decreased relative to the amount of hydroxyacetaldehyde in a substitute egg wash composition free of a nitrogen-containing compound, and browning capability is not decreased.

In particular, tests have shown that a nitrogen-containing compound, alone, does not impart a golden brown color to a heated dough-based foodstuff, unless hydroxyacetaldehyde, like an aqueous composition derived from vapor of a sugar or starch (e.g., MAILLOSE®), also is present. Tests also have shown that, for some types of dough, the dough-based foodstuff reaches a maximum brown color, and further increasing the amount of hydroxyacetaldehyde, or MAILLOSE®, in the substitute egg wash composition does not further increase browning. However, the addition of a nitrogen-containing compound to the substitute egg wash composition did lead to a further increase in browning. Therefore, for a given concentration of hydroxyacetaldehyde, or an aqueous composition like MAILLOSE®, the brown color generated at a particular heating time and temperature correlates to the concentration of nitrogen-containing compound in the composition, i.e., increasing nitrogen-containing compound concentration, also increases browning ability.

The amount of nitrogen-containing compound present in the substitute egg wash composition, therefore, is a function of the desired brown color and gloss of the heated foodstuff, amount of hydroxyacetaldehyde or MAILLOSE®-type composition in the substitute egg wash composition, and the percentage of nitrogen in the nitrogen-containing compound. For example, a compound having a relatively low percentage of nitrogen is present in a higher weight percentage of the composition to provide the same amount of nitrogen as a compound having a relatively high percentage of nitrogen.

The nitrogen-containing compound also has sufficient water solubility to dissolve in the substitute egg wash composition. Therefore, nitrogen-containing compounds having a low water solubility can be used in a present substitute egg wash composition when the amount of nitrogen-containing compound used in the composition is low, i.e., below the water solubility limit of the nitrogen-containing compound.

Examples of inorganic nitrogen-containing compounds include, but are not limited to, ammonium carbonate, ammonium bicarbonate, ammonium hydroxide, ammonium chloride, ammonium benzoate, ammonium sulfate, ammonium bisulfate, ammonium citrate, ammonium tartrate, ammonium phosphate, ammonium nitrate, ammonium oxalate, and mixtures thereof. In general, any ammonium salt having an anion that does not adversely affect the substitute egg wash composition, or a dough-based foodstuff treated therewith, can be used as the nitrogen-containing compound.

Examples of organic nitrogen-containing compounds include, but are not limited to, water soluble amino acids, amides, amines, proteins, protein hydrolyzates, peptides, hydrolyzed collagen, and mixtures thereof. Specific nonlimiting examples of organic nitrogen-containing compounds are glycine, alanine, glutamine, gelatin, and mixtures thereof. The hydrolyzed collagen and gelatin are especially useful because they contribute to browning also contribute to gloss. Mixtures of inorganic and organic nitrogen-containing compounds also can be used in the present substitute egg wash compositions.

The substitute egg wash compositions also can contain other optional ingredients that do not adversely affect the composition or a dough-based foodstuff, and that are commonly used by persons skilled in the art. These optional ingredients are present in an amount sufficient to perform their intended purpose, typically 0% to about 8% by weight of the composition for each optional ingredient, and 0% to about 20% by weight for all optional ingredients. Examples of optional ingredients include, but are not limited to, surfactants to improve wetting of the dough-based foodstuff, detackifiers, plasticizers, seasonings, salt, flavorings, and sweeteners, e.g., sucrose.

Often, an optional ingredient in the substitute egg wash compositions is a surfactant, like lecithin. The surfactant is present in the composition in an amount of 0% to about 2%, and preferably about 0.1% to about 1.5%, by weight of the composition. To achieve the full advantage of the present invention, the surfactant is present in an amount of about 0.2% to about 1%, by weight of the composition.

The surfactant typically is water soluble or water dispersible and has an HLB (hydrophilic-lipophilic balance) value of at least about 10, i.e., about 10 or greater, like about 10 to about 25. Preferred surfactants are nonionic surfactants because nonionic surfactants do not chemically interact with components of the substitute egg wash composition. Especially preferred nonionic surfactants are phospholipids, like lecithin, phosphatidyl ethanolamine, cephalin, phosphatidyl choline, sphingomyelin, and related surfactants.

The surfactant acts as a wetting agent to provide a smoother, more uniform application of the egg wash substitute on the foodstuff. In turn, the gloss and brown color on the heated dough-based foodstuff is more uniform. The surfactant does not give the coated dough a sticky or tacky feel.

To improve flow of the substitute egg wash composition during heating of the dough-based foodstuff, about 0.2% to about 2% of a plasticizer, like propylene glycol, glycerin, sorbitol, mannitol, sucrose, polyethylene glycol, propylene glycol, sodium citrate, triethyl citrate, or acetylated glycerides can be included in the composition. The plasticizer helps promote film flexibility, improves the mechanical properties of the film, and reduces the brittleness of the film. A detackifier, like a polysorbate, can be included to reduce the tacky feel of the heated foodstuff, for example to reduce the tack attributed to a food gum. A detackifier generally is present in an amount of 0% to 1% by weight of the composition.

Secondary film formers also can be included in the substitute egg wash compositions. Typical secondary film formers include, but are not limited to, hydroxypropylmethylcellulose, methylcellulose, hydroxypropylcellulose, and polyvinylpyrrolidone. The secondary film formers are added in an amount of 0% to about 3% by weight of the substitute egg wash composition.

The carrier of the substitute egg wash composition is water. Because the substitute egg wash composition contains aldehydes, the substitute egg wash composition resists bacterial contamination. Therefore, a preservative can be excluded from the substitute egg wash composition. However, if desired, a preservative can be added to the composition to ensure that bacterial contamination is avoided.

Because the present substitute egg wash compositions resist bacterial contamination, they can be stored for extended periods, without refrigeration, and bacterial contamination is avoided. The substitute egg wash compositions, in the absence of a preservative, can be stored for at least six months without being contaminated by bacteria, and, therefore, overcome the problems of: (a) preparing the egg wash immediately before use, (b) discarding unused egg wash, (c) repeated cleaning of application equipment, and (d) contaminating the dough-based foodstuff with bacteria.

A substitute egg wash composition of the present invention is prepared by admixing composition ingredients until the mixture is homogeneous. Alternatively, it is envisioned that the hydroxyacetaldehyde, or the aqueous solution derived from vapor of a pyrolyzed sugar and/or sugar, can be spray dried onto a sugar or starch, such as maltodextrin, to provide a dry powder. This dry powder can be admixed with additional maltodextrin, and/or a food starch, a food gum, and hydrolyzed collagen, and an optional nitrogen-containing compound and other optional ingredients, to provide a dry substitute egg wash composition. A dry substitute egg wash composition is a concentrate that then is diluted with sufficient water to provide a substitute egg wash composition of the present invention.

In one embodiment, the maltodextrin is added to the aqueous portion of the composition solution, with stirring, to completely disperse or solubilize the maltodextrin. Then, if present, a food starch can be added to the mixture to suspend the starch. Next, a surfactant can be added to the mixture. Finally, the mixture is heat processed. After heat processing, an aqueous hydroxyacetaldehyde solution is added to the composition, and is dispersed until homogeneous. The nitrogen-containing compound is added to the substitute egg wash composition after the mixture has cooled, thereby avoiding nitrogen mediated reactions.

A present substitute egg wash composition can be coated onto variety of dough-based foodstuffs to impart a golden brown color and sheen to the exterior of the foodstuff. The substitute egg wash composition can be applied to a fresh dough-coated foodstuff that is prepared, baked, and sold; or to foodstuffs that are prepared, then refrigerated or frozen for later purchase and heating by a consumer. Examples of foodstuffs that can be coated with a substitute egg wash composition of the present invention include, but are not limited to, bread, dinner rolls, puff pastries, biscuits, bagels, pies, meat pies, frozen pot pies, pretzels, fruit-filled pastries, sweet rolls, croissants, muffins, and similar dough-based foodstuffs.

The following tests and examples illustrate the new and unexpected results achieved by the substitute egg wash compositions of the present invention.

In particular, substitute egg wash composition of Example 1 was prepared, then applied as a coating to a dough-based foodstuff.

Example 1

| Ingredient | % (by weight) |
|---|---|
| MAILLOSE ®[1] | 17 |
| Maltodextrin[2] | 3 |
| Modified Food Starch[3] | 12 |
| Water | 68 |

[1] a commercial aqueous solution derived from vapor of a pyrolyzed sugar or starch and containing about 4.2% by weight hydroxyacetaldehyde, available from Red Arrow Products Co., Inc., Manitowoc, WI;
[2] MALTRIN ® M040 maltodextrin, available from Grain Processing Corp., Muscatine, IA; and
[3] PURE-COTE ™ B-790 modified corn starch, available from Grain Processing Corp.

The composition of Example 1 was prepared by admixing the water and MAILLOSE® to provide a homogeneous solution, then dispersing the maltodextrin and modified food starch in the solution. The composition of Example 1 had an excellent viscosity for application to a foodstuff as a spray. Composition viscosity can be increased or decreased by using a different maltodextrin and/or starch, by using a gum, or by adjusting the amount of maltodextrin, starch, and/or gum in the composition.

After heating the foodstuff having a coating of the composition of Example 1, the resulting foodstuff had a golden brown, glossy appearance, that was palatable to consumers and was neither sticky nor tacky. The degree of browning can be increased or decreased by adjusting the amount of MAILLOSE® in the composition, by incorporating a nitrogen-containing compound into the composition, or both.

In one set of tests, the following compositions A through D were prepared and tested as potential egg wash substitutes. Composition E, a traditional egg wash, also was prepared as a control composition.
A. 5% glycerol in water (wt/wt)
B. 10% MAILLOSE® liquid in water (wt/wt)[1]
C. 1% glycerol in a 10% MAILLOSE® solution (wt/wt)[2]
D. 5% glycerol in a 10% MAILLOSE® solution (wt/wt)[2]
E. 9 parts egg yolk and 1 part water (wt/wt)[3]

[1] Composition B was prepared by admixing 1 part by weight MAILLOSE® with 9 parts by weight water;
[2] glycerol was added to a portion of Composition B in a sufficient amount to provide either 1% or 5% by weight glycerol; and
[3] traditional egg wash used as a control.

Each of Compositions A through E was individually applied, as a spray, to chemically leavened refrigerator biscuits using a small hand-operated atomizer in the following average amounts over six replicate tests:

| Composition A | 620 mg (milligrams) |
|---|---|
| Composition B | 650 mg |
| Composition C | 580 mg |
| Composition D | 880 mg |
| Composition E | 530 mg. |

The biscuits then were baked at 45° F. in a conventional oven for ten minutes.

All baked biscuits had a consumer-acceptable brown color. Biscuits coated with the control Composition E had the deepest brown color. Biscuits coated with Composition C were slightly lighter brown in color than biscuits coated with control Composition E. Biscuits coated with Compositions A–D were less glossy in appearance than biscuits coated with control Composition E.

Overall, even though the test biscuits using Compositions A–D lacked optimum gloss, it was demonstrated that MAILLOSE®, i.e., an aqueous solution derived from vapor of a pyrolyzed sugar and/or starch, closely duplicated the brown color imparted by a traditional egg wash to a dough-based foodstuff in both hue and intensity.

In another test, a substitute egg wash composition, i.e., Composition F, was prepared by adding gum arabic to a 10% MAILLOSE® solution prepared by diluting 10 parts MAILLOSE® with 90 parts water on a volume/volume basis. In particular, Composition F was prepared by adding 35 grams of gum arabic to 65 grams of the 10% MAILLOSE® solution. The gum arabic was added to a 10% MAILLOSE® solution, which was previously heated to about 150° F., with rapid stirring.

Composition F was applied to chemically leavened refrigerator biscuits using a pastry brush. The target amount of Composition F and control Composition E applied to the biscuits was 500 mg plus or minus 100 mg. Six replicate tests were performed, and comparisons were made. The average amount of each composition applied to the biscuits was:

| Composition F | 420 mg |
|---|---|
| Composition E (control) | 600 mg. |

The biscuits then were baked in a conventional oven for 10 minutes at 450° F.

An examination of the baked biscuits showed that Composition F effectively imparted gloss to oven-processed bakery products. Composition F did not impart a detectable taste or odor to the baked bakery product. The gloss developed on the biscuits by Composition F, which contains a food gum, was essentially identical to the gloss developed on biscuits treated with control Composition E. The brown color generated by Composition F was less intense than the brown color generated by control Composition E. However, adjusting the concentration of MAILLOSE®, i.e., adjusting the concentration of hydroxyacetaldehyde, in the substitute egg wash composition, or incorporating a nitrogen-containing compound, would provide the desired intensity of brown color when MAILLOSE® is used in conjunction with a food gum.

A series of tests, therefore, was performed to more effectively balance, and optimize, the golden brown color and gloss of a baked dough-based foodstuff when a substitute egg wash composition is used. Accordingly, substitute egg wash compositions having varying amounts of food gum and aqueous solution derived from vapor of a pyrolyzed sugar and/or starch were prepared. In particular, Compositions G–J were prepared and compared to control Composition E for an ability to impart a golden brown color and sheen to a dough-based foodstuff.

Composition G: 30 parts gum arabic/70 parts 15% aqueous MAILLOSE® solution

Composition H: 30 parts gum arabic/70 parts 20% aqueous MAILLOSE® solution

Composition I: 20 parts gum arabic/80 parts 15% aqueous MAILLOSE® solution

Composition J: 20 parts gum arabic/80 parts 20% aqueous MAILLOSE® solution

Compositions G–J were prepared on a weight basis of weight parts gum arabic to weight parts aqueous MAILLOSE® solution. The 15% and 20% aqueous MAILLOSE® solutions were prepared by diluting commercially available MAILLOSE® with water on a volume/volume basis, e.g., 15% aqueous MAILLOSE® was prepared by admixing 15 volume parts MAILLOSE® and 85 volume parts water.

Compositions G–J and control Composition E were applied as a coating to chemically leavened refrigerator biscuits using a pastry brush. The average amount of Compositions E and G–J applied to six replicate biscuits was:

| Composition G | 530 mg |
|---|---|
| Composition H | 540 mg |
| Composition I | 540 mg |
| Composition J | 490 mg |
| Composition E | 560 mg. |

The coated biscuits then were baked for 10 minutes at 450° F. in a conventional oven.

All of the heated biscuits were golden brown and had an excellent gloss. The taste and odor of the heated biscuits were not affected by Compositions G–J or E. Overall, biscuits coated with Compositions G–J had essentially the same gloss and brown color as biscuits coated with Composition E.

From the above tests, a preferred substitute egg wash composition is Composition J, i.e., a composition containing about 20 parts by weight food gum (e.g., gum arabic), food starch, or maltodextrin, and 80 parts by weight of an aqueous solution containing 20 parts by volume MAILLOSE® and 80 parts by volume water, or alternatively expressed as about 14 parts by weight of an aqueous solution derived from vapor of a pyrolyzed sugar or starch. Composition J contained about 0.6% by weight of hydroxyacetaldehyde.

Other tests show that a substitute egg wash composition of the present invention can be used on dough-based foodstuffs that are leavened by yeast, chemically, or by steam, without sacrificing gloss or color.

The following are further examples of the substitute egg wash compositions of the present invention.

Example 2

A substitute egg wash composition of the present invention containing 20 parts by weight gum arabic and 80 parts by weight of an aqueous solution containing 20% by volume MAILLOSE® and 80% by volume water (i.e., Composition J) was applied as a coating to six replicate samples of a commercially prepared, high-fat puff pastry dough. The coated puff pastries were compared to puff pastry coated with control Composition E in freeze/thaw stability studies wherein the coated puff pastry samples were frozen for three days, then baked in an impingement oven for about 10 minutes at 380° F. Comparisons also were made between coated puff pastry samples baked directly from the freezer without thawing, and coated puff pastry samples that were baked after being allowed to thaw. The average amount of substitute egg wash composition of Composition J coated onto a puff pastry was 580 mg. The average amount of control Composition E was 570 mg.

After examining all of the baked puff pastries for gloss and brown color, it was observed that freezing a dough-based foodstuff has, at most, a minimal effect on the ability of a substitute egg wash composition to impart color and sheen to the foodstuff. The puff pastries treated with the composition of Composition J had a gloss and golden brown color essentially identical to puff pastries treated with a traditional egg wash, i.e., Composition E. The taste and odor of the heated puff pastry was not affected by the composition of Composition J. Furthermore, essentially no difference in color or sheen was observed between puff pastries that first were thawed then heated and puff pastries that were heated without thawing.

However, puff pastries treated with the composition of Composition J had a somewhat spotty, nonuniform appearance attributed to an uneven application of the substitute egg wash composition to the puff pastry. It was theorized, but not relied upon, that an uneven application of the substitute egg wash composition can be attributed to the high surface tension between the high-fat puff pastry and the aqueous composition of Composition J, which lacks the natural emulsifying, or wetting, properties of a traditional egg wash. It is envisioned that incorporating an optional surfactant and/or plasticizer into Composition J would provide an even and homogeneous brown color and sheen.

Example 3

Lecithin having a hydrophilic-lipophilic balance (HLB) of twelve was added to the substitute egg wash composition of Composition J. Lecithin was added to reduce the surface tension of Composition J and provide a more uniform coating of a substitute egg wash composition on a dough-based foodstuff, especially a high-fat puff pastry. Lecithin was added to different portions Composition J in amounts of 0.5% and 0.75%, by weight of the composition, to provide Compositions L. Compositions L then each were applied to six replicate samples of commercially prepared, high-fat puff pastry dough with a pastry brush for comparison to puff pastry dough coated with Composition E. The average amount of composition applied to the pastries was:

| | |
|---|---|
| Composition L (containing 0.5% lecithin) | 530 mg |
| Composition L (containing 0.75% lecithin) | 700 mg |
| Composition E | 560 mg. |

All of the coated puff pastry doughs were subjected to freeze/thaw stability studies, wherein the puff pastries were frozen for three days. After three days storage, the coated puff pastries were baked in an impingement oven at 380° F. for about 10 minutes.

The baked puff pastries then were examined and compared for color and gloss. It was observed that puff pastries coated with Compositions L (containing either 0.5% or 0.75% lecithin) exhibited the same gloss and color as puff pastries coated with Composition E. In addition, puff pastries coated with Compositions L had a uniform brown color and gloss. Furthermore, no difference in color or gloss was observed between puff pastries that were baked after thawing and puff pastries that were baked frozen. Neither Composition L imparted a detectable taste or odor to the puff pastry. Finally, Composition L containing either 0.5% or 0.75% lecithin provided the same uniform gloss and color.

Puff pastries coated with the Compositions L retained their glossy appearance for an extended time (i.e., at least the commercial life of the pastry). The present substitute egg wash compositions, therefore, exhibit another advantage, i.e., extended gloss retention.

In addition to a food gum, either a maltodextrin, a hydrolyzed collagen, or a food starch also can be used in a substitute egg wash composition of the present invention, as illustrated in Examples 4 through 7.

Example 4

A substitute egg wash composition incorporating maltodextrin as the food starch was prepared. Composition M was prepared by adding 25 parts by weight maltodextrin (MALTRIN® M040, available from Grain Processing Co.) to 73.4 parts by weight of an aqueous solution containing 20% MAILLOSE® and 80% water (volume/volume). To this mixture was added 1 part by weight glycerol, 0.5 parts by weight lecithin, and 0.1 part by weight xanthan gum, with stirring, until a uniform composition resulted.

The resulting Composition M then was applied to replicate samples of a commercially prepared puff pastry dough, and the treated puff pastry dough was baked and evaluated according to the conditions given in Example 3. The average amount of composition applied to the pastries were as follows:

| | |
|---|---|
| Composition M | 460 mg |
| Composition E | 540 mg. |

Inspection of the baked pastries showed that freezing had little effect on Composition M with respect to imparting gloss and browning to a dough-based foodstuff. Puff pastries coated with Composition M had the same uniform gloss and brown color as pastries coated with a traditional egg wash, i.e., Composition E. Composition M did not change the taste or odor of the puff pastry.

Example 5

A substitute egg wash composition incorporating a modified food starch was prepared. Composition N was prepared by adding 10 grams of a modified food starch (i.e., PURE COTE® B-790, available from Grain Processing Corp.), 20 g corn syrup (DE 43), and 1 g glycerol to 68.5 g of an aqueous solution containing 20% MAILLOSE® and 80% water (volume/volume). The resulting mixture was stirred and heated, and held at 160° F. for at least 10 minutes. After heating, 0.5 g lecithin was added to the mixture, and the resulting mixture was stirred until homogeneous.

The resulting Composition N then was applied to replicate samples of a commercially prepared puff pastry dough, and the coated puff pastry dough was baked and evaluated according to the conditions given in Example 3. The average amount of composition applied to the pastries were as follows:

| | |
|---|---|
| Composition N | 630 mg |
| Composition E | 580 mg. |

Inspection of the baked pastries showed that the color and sheen of the pastries coated with Composition N exceeded the color and sheen of puff pastries coated with the traditional egg wash (i.e., Composition E). It also was found that the degree of brown color can be adjusted by varying the amount of aqueous solution of vapor derived from pyrolyzed sugar, i.e., hydroxyacetaldehyde, and/or starch in the substitute egg wash composition. The enhanced gloss of pastries coated with Composition N adds to the palatability of the dough-based foodstuff.

The viscosity of Composition N was greater than the viscosity of Composition E, which could cause problems with certain types of application treatment. However, the viscosity of Composition N, and similar compositions, can be adjusted with additives or by adjusting the amount of maltodextrin, food starch, hydrolyzed collagen, or food gum in the substitute egg wash composition.

Example 6

A substitute egg wash incorporating SOL-U-PRO gelatin, (available from DynaGel, Inc., Calumet City, Ill.) as the nitrogen-containing compound was prepared by adding 3 parts (by weight) maltodextrin (i.e., MALTRIN® M040) to 82.75 parts of an aqueous solution containing 20 parts by weight MAILLOSE® and 80 parts by weight water, with agitation to effect solution. Then, 12 parts by weight of modified food starch (i.e., PURE COTE™ B790) were added, with mixing, to suspend the starch. Lecithin (0.25 parts), if included in the composition, then can be added. The resulting solution then was processed in a steam kettle, or retort, with a scraper type agitator at 200° F. for approximately 45 minutes. The solution then was cooled to room temperature, or lower, prior to adding 2 parts by weight SOLU-U-PRO gelatin.

The resulting substitute egg wash composition was applied to rolls and buns prepared from standard frozen bread dough, to pot pie crusts, and to commercially prepared puff pastry dough at the rate of about 0.20 grams per square inch.

After heating and evaluating the finished bakery products, it was observed that the nitrogen-containing compound, i.e., SOL-U-PRO, a collagen hydrolysate, increased the browning capability of the substitute egg wash composition. Accordingly, it has been demonstrated that incorporating a nitrogen-containing compound makes it possible to decrease the amount of MAILLOSE® in the substitute egg wash composition. In addition to increasing the browning capability of the substitute egg wash composition, the hydrolyzed collagen also was instrumental in developing a good sheen on the heated dough-based foodstuffs.

Example 7

A substitute egg wash composition was prepared by incorporating a waxy maize maltodextrin (i.e., M 01960, available from Cerestar, Ind.) as a substitute for MALTRIN M0404. Compositions containing 3 parts and 6 parts by weight of the waxy maize maltodextrin were evaluated. The substitute egg wash composition was prepared according to the method of Example 6. The substitute egg wash composition was applied to bakery products as described in Example 6.

Evaluation of the heated bakery products showed that 3 parts by weight of M 01960 provided a sheen equivalent to MALTRIN M040 at the same level. Using 6 parts by weight M 01960 yielded an enhanced glossiness compared to the sheen imparted by M040 at both the 3 parts and 6 parts by weight.

Additional tests were performed to evaluate the effects of: (a) adding nitrogen-containing compounds to a substitute egg wash composition, (b) the pH of the composition, and (c) heating temperature, on the ability of a substitute egg wash composition to impart sheen and a golden brown color to dough-based foodstuffs.

In a majority of the tests, a puff pastry dough was used to test the various substitute egg wash compositions. A standard puff pastry dough formula disclosed in *Food Products Formulary*, Volume 2, "Cereals Baked Goods Dairy and Egg Products," by D. K. Tresler et al. (1975) was altered slightly for these tests. The puff pastry dough formula used in these tests contained, in parts by weight, all-purpose flour (100 parts), salt (1 part), shortening (33 parts), cream of tartar (0.5 part), and water (58 parts). The dough was prepared and allowed to sit at room temperature for at least four hours before use.

The baking oven used in the tests was a Lincoln IMPINGER, available from Foodservice Products, Inc. For a majority of the tests, the dough was baked using a conveyor speed set at 6 (i.e., the retention time of the dough in the oven was about 6.5 minutes), and the temperature was about 400° F. (204° C.), unless otherwise specified.

To perform comparative tests, other doughs, such as for bread, rolls, and pretzels, also were tested to determine the extent of browning and sheen imparted by a substitute egg wash composition. The bread dough formula (as modified from *Food Products Formulary*, Vol. 2) contains (in parts by weight): (a) a sponge containing all-purpose flour (32.65 parts), water (19.59 parts), shortening (1.63 parts), and yeast (1.16 parts), and (b) a dough containing all-purpose flour (21.77 parts), light corn syrup (6.15 parts), water (12.89 parts), nonfat milk solids (2.72 parts), and salt (1.16 parts). The sponge, under controlled humidity, was fermented at room temperature for about 4 to 5 hours. Then the dough was prepared and admixed with fermented sponge. This dough is baked at 400° F. for 6 minutes, whereas the original dough formula required baking at 425°–450° F. for about 15–40 minutes.

The modified pretzel formula contained, in parts by weight, all-purpose flour (70.05 parts), water (28.02 parts), yeast (0.18 part), shortening (0.88 part), and malt (0.88 part). The dough was proofed at 100° F. for about 5 minutes. The substitute egg wash composition was applied on the dough surface and the dough was baked at 400° F. for about 6 minutes. A standard pretzel dough formula requires using an alkaline treatment of 1–1.5% sodium hydroxide at 200° F. for about 10–15 seconds, and baking at about 500° F. for about 3.5–8 minutes.

The roll dough formula contained, in parts by weight, all-purpose flour (50.96 parts), shortening (6.11 parts), salt (1.02 parts), dextrose (5.10 parts), nonfat milk solids (2.04 parts), sodium bicarbonate (2.16 parts, optional), and water.

To determine the ability of a substitute egg wash composition to impart a shiny, brown color to a dough-based foodstuff, the composition was prepared shortly before applying the composition to the dough surface. In order to minimize experimental error, 15 g (grams) of dough was used in each experiment, unless otherwise specified. The dough was pressed into the form of a disk having a thickness of 5–7 mm (millimeters) and a smooth surface. The amount of substitute egg wash composition brushed on the dough surface was sufficient to thoroughly and completely cover the dough surface.

The brown color developed on the baked, or heated, foodstuff was measured using a Minolta Chroma Meter CR-300. All colors were recorded in a Hunter Lab color system. The light source was a CIE Standard Illuminant C. Each baked dough sample was measured on at least four different spots. The color of the baked dough samples, as L, a, and b. Color space values were calculated using the Chroma Meter CR-300.

In addition, a visual evaluation of the baked dough samples was performed. The visual evaluation is a subjective test performed by an evaluator having excellent chromatic discrimination. The visual evaluation results are accurate for dough samples that have been directly compared. The visual evaluation is used in conjunction with the measured color strength L and chromatic coordinates a and b, in order to measure of consumer perception of a specific color. The general color descriptors used in the visual evaluation were: black brown, dark brown, deep brown (strong brown), brown, light brown, slight brown, white (e.g., not brown or insufficiently brown).

The first test investigated the effect of pH on the ability of a substitute egg wash composition to impart a brown color to dough. In this test, the puff pastry dough was used, and the substitute egg wash compositions contained, hydroxyacetaldehyde (HA) (1 g of a 67% by weight aqueous solution), glutamine (1.64 g), buffer (19.8 g), propylene glycol (0.75 g), M-180, a maltodextrin available from Archer-Daniels-Midland, Decatur, Ill., (1.6 g), gum arabic (2 g). Different substitute egg wash compositions having a pH from 1.4 to 12 were prepared by using a suitable buffer, in particular a pH of 1.4, 4, 6, 8, 10, and 12. In these tests, HA was present in an amount of about 2.5% by weight of the substitute egg wash composition.

Each baked dough sample was ranked as being dark brown by visual evaluation, which was confirmed by the measured color space values. It also was observed that the substitute egg wash compositions having a pH 4 and 10 were more viscous than the other compositions, and the compositions of pH 4, 8, 10, and 12 easily browned the dough samples, even at room temperature. Browning of a dough sample with a composition of pH 4 was extremely fast at room temperature.

Overall, it was determined that pH has an insignificant effect on the browning capability of the substitute egg wash compositions. The presence of glutamine, a nitrogen-containing compound, in these compositions possibly lowered the activation energy for the browning reaction, thereby increasing the reaction rate and making browning easier. Overall, when HA concentration of the composition is relatively high, as in this test, the browning ability of the composition at different pH values was so high at relatively high temperatures that the effect of pH was insignificant.

Another test was performed to determine the effect of different ammonium salts on the ability of a substitute egg wash composition to brown a dough-based foodstuff. In this test, the puff pastry dough was used, and the substitute egg wash composition contained 67% aqueous HA (0.5 g), ammonium salt (0.0056 mole), propylene glycol (0.75 g), M-180 and gum arabic mixture (2.3:4, 1.8 g), and pH 6 buffer solution (19.8 g). The following table summarizes the results of thirteen separate tests.

TABLE 1

| Test No. | Ammonium Salt | Visual Evaluation |
|---|---|---|
| 1 | ammonium hydroxide | golden brown |
| 2 | ammonium acetate | golden brown |
| 3 | ammonium citrate | golden brown |
| 4 | ammonium dihydrogen phosphate | golden brown |
| 5 | ammonium chloride (0.4 g) | golden brown |
| 6 | ammonium chloride (0.3 g) | golden brown |
| 7 | ammonium bicarbonate (0.56 g) | golden brown |
| 8 | ammonium bicarbonate (0.44 g) | golden brown |
| 9 | ammonium persulfate | golden brown |
| 10 | ammonium sulfate | golden brown |
| 11 | ammonium phosphate | golden brown |
| 12 | soy protein (0.8 g) | deep brown |
| 13 | HA | golden brown |

The measurement of color space values confirmed the visual evaluations summarized in Table 1.

The substitute egg wash compositions of Test Nos. 2 and 7 were yellow in color, whereas the composition of Test No. 3 was yellow brown and the composition of Test No. 11 was brick red or deep brown. The other substitute egg wash compositions were colorless. The test showed that adding a low concentration of an ammonium ion, or an amino acid, to the composition increased the browning capability of hydroxyacetaldehyde or a product like MAILLOSE®. In addition, if browning is desired at a relatively low temperature, it is preferable to use ammonium phosphate, ammonium citrate, ammonium bicarbonate, or ammonium acetate.

A further test to determine the effect of baking temperature on browning was performed. The puff pastry dough, and the same thirteen substitute egg wash compositions listed in Table 1 were used. The coated dough samples were baked at 250° F., 350° F., or 450° F. The baked dough samples ranged from slightly brown (250° F.), to lightly brown (350° F.), to brown (450° F.). No appreciable color difference was observed between the thirteen dough samples baked at the same temperature. At 250° F., baking evaporates less water and, accordingly, brown color generation is impeded. Higher baking temperatures, therefore, are more favorable to brown dough-based foodstuffs with a substitute egg wash composition.

Another set of tests was performed to determine the ability of an organic nitrogen-containing compound to improve the browning capability of a substitute egg wash composition. In particular, substitute egg wash compositions containing varying amounts of MAILLOSE® and alanine, at pH 4, were applied to the puff pastry dough. The coated dough then was heated.

It was observed that the color strength (L) and color quality (a and b) were improved by including an amino acid in the substitute egg wash composition. In addition, the same or a similar brown color can be achieved by using different ratios of MAILLOSE® to alanine. In particular, it was observed that using alanine or other amino acids can reduce the amount of hydroxyacetaldehyde or MAILLOSE® required to generate a specific brown color. For example, by including 0.9% of alanine in the substitute egg wash composition, only 1.27% HA was required to generate a golden brown color. In comparison, in the absence of an amino acid, 1.9% HA was required to achieve the same or similar golden brown color. It is theorized that alanine interacts with HA, or MAILLOSE®, and increases browning, because alanine alone cannot generate a brown color on a dough-based foodstuff. Other effective organic nitrogen-containing compounds are glycine, glutamine, and soy protein. This test also showed that browning is influenced by the amount of dough used. The larger the mass of dough, the lower the temperature of dough surface during baking, and, accordingly, a lighter the brown color is generated.

A test also was performed to determine the levels of glycine and MAILLOSE®, i.e., HA, needed to provide a consumer-acceptable brown color. Puff pastry dough was used in this test. A variety of substitute egg wash compositions, having a pH of 8, a glycine range of 0 to 3 g, and an HA (aqueous 67%) range of 0.07 to 0.36 g, in 15 g of buffer solution, were prepared and used to treat the puff pastry dough.

Overall, the tests showed that the browning capability of a substitute egg wash composition is enhanced by the addition of glycine. It also was observed that different ratios of glycine to MAILLOSE® produced an identical strong golden brown color desired by consumers. In particular, an identical color can be achieved by reducing the MAILLOSE® content in the substitute egg wash composition and increasing the glycine content.

For example, six different HA/glycine ratios provided a golden brown color. In this case, a combination of 0.31% HA and 20.01% glycine generated a similar color which otherwise is achieved using 0.93% HA and 5.34% glycine. When glycine content was at least 10%, the generation of a brown color largely depended on HA content, i.e., 0.31–0.67% HA strong golden brown, 0198–1.34% HA deep brown, and 1.60% HA dark golden brown. The brown color generated by MAILLOSE® in the absence of glycine is a plain golden brown, and the addition of glycine makes the brown color brighter, and, thus, more palatable.

A similar test was performed using substitute egg wash composition containing ammonium acetate. The substitute egg wash compositions contained from 0.035 to 0.18 g HA, and 0.05 to 1.54 g ammonium acetate in 7.5 g of pH 8 buffer solution. The compositions were applied to puff pastry dough, which was subsequently heated. Test results showed that ammonium acetate has a positive effect on the browning capability of a substitute egg wash composition, but the effect is less pronounced than the effects of glycine or ammonium sulfate. Soy protein hydrolysate also was demonstrated to have a positive effect on the browning capability of the substitute egg wash composition.

In addition, similar tests showed that bread dough and pretzel dough also generate a golden brown color when coated with a present substitute egg wash composition. The browning of roll dough, containing and lacking sodium carbonate, with a substitute egg wash composition also was investigated. The substitute egg wash composition contained HA and soy protein hydrolysate, and had a pH of 4. The roll dough with sodium carbonate was baked at 400° F. for 3 minutes, and without sodium carbonate at 400° F. for 6 minutes.

The roll dough containing sodium bicarbonate generated a brown or deep brown color (i.e., a light coffee-like color) even without the application of a substitute egg wash composition. However, the brown color was dull and unattractive. The roll dough containing sodium bicarbonate actually got lighter if a substitute egg wash composition was applied. This is because the pH of the dough surface was neutralized by the substitute egg wash composition of pH 4, and the surface color was changed by the reaction. The color thus formed was light and dull. When the sodium bicarbonate was omitted from the roll dough, all dough samples became golden brown color when the substitute egg wash composition was applied to the dough surface. The application of a substitute egg wash composition, therefore, could be advantageous over the use of sodium bicarbonate in two respects. First, sodium ion concentration is reduced to a minimal level, and this is beneficial from a health standpoint, and, second, application of a substitute egg wash composition generates a more attractive brown color.

As previously stated, MAILLOSE® can be sprayed onto a maltodextrin to provide a dry MAILLOSE® product. However, this dry product, as is, did not provide a golden brown, shiny appearance that consumers require on dough surfaces. In particular, a 15% aqueous solution of the dry MAILLOSE® product did not provide a sufficient shiny dough surface. In addition, the viscosity of the solution was so low that the solution dripped from the top surface of the dough, which yielded a heated dough product having an uneven brown color. Furthermore, the dry MAILLOSE® product contains an inappropriate level of MAILLOSE® relative to maltodextrin to provide a useful substitute egg wash composition.

However, the dry MAILLOSE® product can be admixed with maltodextrins, a food starch, a hydrolyzed collagen, and/or a food gum, in addition to a nitrogen-containing compound and any other desired optional ingredients, to yield a dry composition that, after appropriate dilution with water, provides a substitute egg wash composition of the present invention.

The present substitute egg wash compositions have a viscosity that allows easy pumping and spraying to achieve homogeneous application to a dough-based foodstuff. The present compositions also have excellent adherence to a dough-based foodstuff, thereby facilitating coating the foodstuff with seeds, like sesame or poppy seeds covering a bagel. A foodstuff coated with a substitute egg wash composition can be refrigerated or frozen for heating at a later time, or can be baked immediately. In addition, a coated foodstuff can be heated in a conventional, convection, or microwave oven, or a toaster, to impart a uniform golden brown coated with a high gloss. The substitute egg wash compositions also can be applied to a dough-based foodstuff that is pre-prepared, then frozen, and eventually reheated in a microwave oven. The substitute egg wash compositions can be used on such pre-prepared foodstuffs because the brown color and gloss are stable over time. Alternatively, the substitute egg wash composition can be applied after preparation of and freezing the foodstuff to generate a brown color and gloss during the reheating step in the microwave oven.

Obviously, many modifications and variations of the invention as hereinbefore set forth can be made without departing from the scope thereof, and, therefore, only such limitations should be imposed as are indicated by the appended claims.

What is claimed is:

1. A browning composition for dough-based foodstuffs comprising:
   (a) about 0.1% to about 5%, by weight, hydroxyacetaldehyde;
   (b) about 1% to about 25%, by weight, of a food starch, a maltodextrin, a hydrolyzed collagen, a food gum, or mixtures thereof;
   (c) 0% to about 20%, by weight, of a nitrogen-containing compound; and
   (d) water.

2. The composition of claim 1 further comprising 0% to about 2% by weight of a surfactant.

3. The composition of claim 2 wherein the surfactant is present in an amount of about 0.% to about 1.5%, by weight.

4. The composition of claim 2 wherein the surfactant comprises a nonionic surfactant having an HLB value of about 10 to about 25.

5. The composition of claim 2 wherein the surfactant is selected from the group consisting of a phospholipid, lecithin, phosphatidyl ethanolamine, cephalin, phosphatidyl choline, and sphingomyelin.

6. The composition of claim 1 wherein the composition is free of a preservative.

7. The composition of claim 1 wherein the hydroxyacetaldehyde is derived from vapor of a pyrolyzed sugar or starch.

8. The composition of claim 1 containing hydroxyacetaldehyde in an amount of about 0.2% to about 4% by weight.

9. The composition of claim 1 containing about 8% to about 20%, by weight, of the food starch, the maltodextrin, the hydrolyzed collagen, the food gum, or mixtures thereof.

10. The composition of claim 1 wherein the composition contains a food starch, a maltodextrin, a hydrolyzed collagen, or a mixture thereof.

11. The composition of claim 1 wherein the food starch is selected from the group consisting of corn starch, potato starch, wheat starch, oat starch, rice starch, tapioca starch, a starch hydrolyzate having a dextrose equivalent of about 5 to about 25, dextrin, microcrystalline cellulose, and mixtures thereof.

12. The composition of claim 1 wherein the maltodextrin has a dextrose equivalent of about 4 to about 19.

13. The composition of claim 1 wherein the hydrolyzed collagen comprises gelatin.

14. The composition of claim 1 wherein the food gum is selected from the group consisting of locust bean gum, quince gum, guar gum, gum tragacanth, gum arabic, an algin, gellan gum, pectin, ghatti, gum karaya, agar, xanthan gum, carrageenan, an alginate, and mixtures thereof.

15. The composition of claim 1 containing a food starch and a maltodextrin in a weight ratio of starch to maltodextrin of about 20:1 to about 1:1.

16. The composition of claim 15 further containing a hydrolyzed collagen.

17. The composition of claim 1 wherein the nitrogen-containing compound is present in an amount of about 2% to about 12%, by weight, of the composition.

18. The composition of claim 1 wherein the nitrogen-containing compound comprises an inorganic compound.

19. The composition of claim 18 wherein the nitrogen-containing compound comprises an ammonium salt.

20. The composition of claim 18 wherein the inorganic compound is selected from the group consisting of ammonium carbonate, ammonium bicarbonate, ammonium hydroxide, ammonium chloride, ammonium acetate, ammonium persulfate, ammonium dihydrogen phosphate, ammonium benzoate, ammonium sulfate, ammonium bisulfate, ammonium citrate, ammonium tartrate, ammonium phosphate, ammonium nitrate, ammonium oxalate, and mixtures thereof.

21. The composition of claim 1 wherein the nitrogen-containing compound comprises an organic compound.

22. The composition of claim 21 wherein the organic compound is selected from the group consisting of a water-soluble amino acid, an amide, an amine, a protein, a protein hydrolyzate, a peptide, a hydrolyzed collagen, and mixtures thereof.

23. The composition of claim 1 wherein the composition imparts no detectable taste or odor to the dough-based foodstuff.

24. A method of browning and imparting gloss to a dough-based foodstuff comprising:
   (a) applying a coating of a browning composition to an exterior surface of the dough-based foodstuff, said composition comprising:
      (i) about 0.1% to about 5%, by weight, hydroxyacetaldehyde;
      (ii) about 1% to about 25%, by weight, of a food starch, a maltodextrin, a hydrolyzed collagen, a food gum, or mixtures thereof;
      (iii) 0% to about 20%, by weight, of a nitrogen-containing compound; and
      (iv) water; and
   (b) heating the coated dough-based foodstuff.

25. The method of claim 24 wherein the composition further comprises 0% to about 2% by weight of a surfactant.

26. The method of claim 24 wherein the dough-based foodstuff is selected from the group consisting of bread, a dinner roll, a puff pastry, a baked pate, a biscuit, a bagel, a pie, a meat pie, a frozen pot pie, a pretzel, a fruit-filled pastry, a sweet roll, a croissant, and a muffin.

27. The method of claim 24 wherein the dough-based foodstuff is a frozen or refrigerated pre-prepared foodstuff.

28. The method of claim 24 wherein the dough-based foodstuff is a fresh foodstuff.

29. The method of claim 24 wherein the coated dough-based foodstuff is heated in a regular oven, a convection oven, a microwave oven, or a toaster.

30. The method of claim 24 wherein the composition has a sufficiently low taste and odor such that no detectable taste or odor is imparted to the dough-based foodstuff.

* * * * *

UNITED STATES PATENT AND TRADEMARK OFFICE
CERTIFICATE OF CORRECTION

PATENT NO. : 5,756,140
DATED : May 26, 1998
INVENTOR(S) : John Shoop et al.

It is certified that error appears in the above-identified patent and that said Letters Patent is hereby corrected as shown below:

Column 6, line 41, "40°" should be --4°--

Column 8, line 64, "126" should be --12%--

Column 24, line 35, "0.%" should be --0.1%--

Signed and Sealed this

Third Day of August, 1999

*Attest:*

Q. TODD DICKINSON

*Attesting Officer*    Acting Commissioner of Patents and Trademarks